(12) United States Patent
Wendt et al.

(10) Patent No.: US 9,967,953 B2
(45) Date of Patent: May 8, 2018

(54) IDENTIFICATION DEVICE AND IDENTIFICATION SYSTEM FOR A LIGHTING SYSTEM

(71) Applicant: PHILIPS LIGHTING HOLDING B.V., Eindhoven (NL)

(72) Inventors: Matthias Wendt, Würselen (DE); Lennart Yseboodt, Retie (BE); Bozena Erdmann, Aachen (DE); Manuel Eduardo Alarcon-Rivero, Delft (NL); Maurice Herman Johan Draaijer, Ittervoort (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/543,347

(22) PCT Filed: Jan. 4, 2016

(86) PCT No.: PCT/EP2016/050022
§ 371 (c)(1),
(2) Date: Jul. 13, 2017

(87) PCT Pub. No.: WO2016/113146
PCT Pub. Date: Jul. 21, 2016

(65) Prior Publication Data
US 2018/0007764 A1    Jan. 4, 2018

(30) Foreign Application Priority Data

Jan. 14, 2015 (EP) .................................... 15151060

(51) Int. Cl.
*H05B 37/04* (2006.01)
*H05B 37/02* (2006.01)
*G06F 3/14* (2006.01)

(52) U.S. Cl.
CPC ........... *H05B 37/0245* (2013.01); *G06F 3/14* (2013.01); *H05B 37/0272* (2013.01)

(58) Field of Classification Search
CPC ................................................. H05B 37/0272
USPC ................... 315/130–133; 340/384.1, 815.4
See application file for complete search history.

(56) References Cited

U.S. PATENT DOCUMENTS

| | | | |
|---|---|---|---|
| 7,307,542 B1 | 12/2007 | Chandler et al. | |
| 8,049,434 B2 | 11/2011 | Crouse et al. | |
| 8,504,008 B1 * | 8/2013 | Gossweiler, III . | H04M 1/72533 455/419 |
| 9,763,310 B2 * | 9/2017 | Dahlen .............. | H05B 37/0245 |

(Continued)

FOREIGN PATENT DOCUMENTS

EP         2387293 A2    11/2011

*Primary Examiner* — Thuy Vinh Tran
(74) *Attorney, Agent, or Firm* — Meenakshy Chakravorty

(57) ABSTRACT

A lighting system, an identification system and an identification device for a lighting system, wherein the lighting system comprises a plurality of components. The identification device comprises a transmitter adapted to receive an identification request, and a signaling apparatus comprising a control unit and one or more signaling devices, wherein the control unit is adapted to control the one or more signaling devices so that, in response to receipt of the identification request, an identification signal is produced that alerts a human to a location or direction of one or more of the components.

12 Claims, 3 Drawing Sheets

(56) References Cited

U.S. PATENT DOCUMENTS

2003/0020595 A1* 1/2003 Wacyk .............. H04L 29/12264
340/3.5

\* cited by examiner

IDENTIFICATION DEVICE AND IDENTIFICATION SYSTEM FOR A LIGHTING SYSTEM

CROSS-REFERENCE TO PRIOR APPLICATIONS

This application is the U.S. National Phase application under 35 U.S.C. § 371 of International Application No. PCT/EP2016/050022, filed on Jan. 4, 2016, which claims the benefit of European Patent Application No. 15151060.9, filed on Jan. 14, 2015. These applications are hereby incorporated by reference herein.

TECHNICAL FIELD

The present invention relates to an identification device for a lighting system, the lighting system comprising a plurality of components.

BACKGROUND

Modern lighting systems, such as Power-over-Ethernet (PoE) lighting installations, tend to comprise a large number of components that are connected by means of a communication network. The components are for example, luminaires, switches, power supply engines (PSEs), sensors, speakers, and/or air management devices, etcetera. The sensors are for example smoke detectors, motion detectors, light detectors, etcetera.

The lighting systems are often commissioned in an abstract way in that they fail to follow references to pre-planned locations for installing the components, and/or the installing person fails to clearly record the installed locations for future reference. The cable connections between the components are normally hidden behind a ceiling making visual identification of the connections between different components in the network difficult. Furthermore, sometimes the cables are not cut to size and placed in loops. Thereby, the cables may be entangled in each other making visual identification impossible. Furthermore, additional chaos is introduced if changes are made to a system after it has initially been installed. Multiple restrictions then sometimes force the installer to be 'creative' with wiring or cause him to make non-obvious connections. It is known from the publication of U.S. Pat. No. 8,049,434 B2 that, as part of a commissioning process, luminaires can be controlled to emit light based on their physical address in a lighting system. Yet, it remains difficult for an operator to subsequently find a specific component in the lighting system, for example a defective component that is to be exchanged.

SUMMARY

The object of the present invention is to facilitate the finding of one or more specific components in a lighting system.

This object is provided by an identification device for a lighting system that comprises a plurality of components, and wherein the identification device comprises:

a receiver adapted to receive an identification request from a user device, and signaling apparatus comprising a control unit and one or more signaling devices, wherein the control unit is adapted to control the one or more signaling devices so that, in response to receipt of the identification request, an identification signal is produced that alerts a human to a location or direction of one or more of the components.

The identification device comprises the receiver that is adapted to receive the identification request that has been transmitted from the user device. The components are provided with identifiers that designate each component with a unique identify within the lighting system. Preferably, the components of the lighting system are connected in a communication network that enables information and the identification request to be transferred to the components. For example, the components may have been provided with identifiers that give the components unique identities within the communication network. The communication network is for example an Ethernet network, where each component has a unique address providing the component with the unique identity in the lighting system.

The identification device further comprises the signaling apparatus comprising the control unit and the one or more signaling devices. The control unit is adapted to monitor whether an identification request has been received. Upon receipt of such an identification request, the control unit is adapted to control the one or more of the signaling devices so that an identification signal is produced that identifies the one or more components to the user.

The identification device enables an operator to quickly identify one or more specific components in the lighting system. The identification request can for example be sent remotely on the communication network without any need for direct contact with the components. For example, the operator can transmit the identification request to the one or more components in the ceiling when standing on the floor of a building. Accordingly, the identification device provides a solution to the problem of identifying components in a lighting system. Thus, the invention enables the user to locate one or more specific components of the lighting system, for example in order to identify components that have been in operation for a certain period of time so that the components can be replaced with new components.

Preferably, said identification device or at least said one or more signaling devices is/are incorporated in a respective one of said components (in the same housing) or otherwise located at a respective location of the respective component (e.g. placed next to it). In this case, the identification signal is emitted from the respective location of the respective component. In embodiments, there is provided a system in which another respective instance of the identification device or the one or more signaling devices is incorporated in each of a plurality of others of said components, or otherwise located at a respective location of each of a plurality of others of said components. Thus a respective instance of the identification signal can be emitted from the respective location of each of said one and said plurality of others of the components.

Furthermore, preferably the wherein the identification signal comprises at least one signal directly perceivable by the human user. E.g. the one or more signaling devices may comprise one or both of: a light source, said identification signal comprising a visible signal emitted by the light source; and/or a sound source, said identification signal comprising an audible signal emitted by the sound source.

In embodiments of the invention, the components are provided with identifiers arranged so that each component has a respective unique identity within the lighting system, and the identification request is directed to a specified one or more of said components based on one or more of the identities, the control unit being adapted so that the identification signal is produced in dependence on which of the components the identification request is directed to. Thus the identification request is selectively directed to only one or a subset of the components of the lighting system. E.g. the identification request may include an address (ID) of the intended component, and the control unit at each component listens for an identification request that is relevant to it based on the included address, and generates the identification signal accordingly. Or in further embodiment, the control unit may support more intelligent requests such as "which component of type X is component with address Y connected to?", e.g. which PSE or network switch is a component with the specified ID adjacently connected to.

For instance, the control unit at each component may listen for an identification request including its own address (if alerting the user to itself), or the address of a neighboring component (if alerting the user to a neighbor). That is, in embodiments, the identification signal is emitted in response to the identification request being directed to the respective component, thereby alerting the user to the location or direction of the respective component. Alternatively or additionally, the identification signal is emitted from the respective component in response to the identification request being directed to a neighboring one of said components within a predetermined proximity from the respective component (e.g. within a certain radius in the horizontal plane or in three dimensions) or a predetermined number of network links from the respective component (a certain number of hops, e.g. an adjacently connected component, i.e. connected by a single network link or hop); thereby alerting the user to the direction or location of the neighboring component.

In embodiments of the invention, one, some or all of the components of the lighting system are substantially hidden from human perception in their normal installed state and/or normal operation, e.g. cannot be seen by a user in their normal installed state and/or normal operation. For example, some of the components may be hidden behind a ceiling or wall. The invention facilitates the user in finding theses hidden components without removing the ceiling.

In embodiments, the components of the lighting system comprise one or more components of a first type whose main function is emitting light (i.e. luminaires) and one or more components of a second type whose main function is other than emitting light (e.g. controllers, power supplies, sensors, etc.), wherein the identification device is adapted to enable locating components of either or both the first type and/or the second type using said one or more signaling devices.

In some particular embodiments of this, a component of the first type (luminaire) may be arranged to indicate the location or direction of a neighboring component of the second type (that is not a luminaire). For example, a luminaire may detect an identification request directed to a neighboring component that is not a luminaire, such as a power supply (PSE) or switch to which it is located nearby (e.g. within a certain radius) or connected (e.g. by an adjacent connection, i.e. a direct link); and in response the luminaire may use its illumination source to emit a signal (e.g. by flashing). The user can then tell that the component they seek is nearby or connected to the signaling luminaire.

In yet further embodiments, the control device may be configured so that a relationship between two or more of the components is indicated by a relative pattern formed between the identification signals emitted by two or more of the components.

For instance, the relationship being indicated may comprise a spatial proximity of the components, or a logical relationship in terms of connections (links) between the components within the network. The relationship being indicated may for example be: that the components are (i) within a same group of components of the component to which the identification request was directed, (ii) within a group of components specified in the identification request, (iii) within a certain proximity (e.g. radius) of the component to which the identification request was directed, (iv) within a certain number of network links (hops) of the component to which the identification request was directed, (v) along a certain network path specified in the identification request, (vi) connected to a power supply engine (PSE) or switch specified in the identification request, or (vii) connected to the same PSE or switch as the component to which the identification request was directed. Such a relationship may indicated be indicated for example by synchronization of time-varying patterns in the identification signals emitted from the two or more components, e.g. the identification signals blinking and/or beeping synchronously. The use of such synchronized blinking and/or beeping or the like has the advantage that the two or more related components are easy to identify by observing the lighting system.

Alternatively or additionally, the indication of the relationship may comprise indicating in what manner the two or more components are related, e.g. that the components are connected in a certain spatial sequence (such as in a row), or a logical sequence of network connections (links) between the components. Such a relationship may be indicated for example by a time shift in the identification signals emitted by the two or more components. Accordingly, the identification signals of a first component is emitted before the identification signals of a second component, to indicate that one is connected onwards to another by an adjacent network link, or is the next in a row. The use of the time shift in the identification signals has the advantage again that the relationship is easy to identify by observing the lighting system.

In embodiments, the one or more signaling devices are adapted to produce one of a visual, an audible, an ultrasound and/or a radio frequency identification signal. Preferably the one or more signaling devices are located at or in the vicinity of their respective components of the lighting system and the emitted identification signal is directly perceivable by one or more of the human senses, and is emitted into the shared environment of the component and the user who instigated the identification request so as to be perceived by that user. For instance a visual and/or audible signal enables the operator to identify the one or more components remotely. Alternatively or additionally however, the identification signal may comprise a signal that is not directly perceivable by the human senses, but is instead sent to a user device of the user to be converted to perceptible form. The use of a non-perceptible signal such as an ultrasound or RF identification signal has the advantage that the identification signal cannot be heard and therefore is not disturbing to people close to the lighting system. The ultrasound identification signal can however be detected by a user device such as a smart phone or tablet so that the component to which the identification request is directed can be identified. The use of a radio frequency identification signal provides the advantage that it enables the identity of the component to be confirmed on a user device.

According to one embodiment of the invention, the identification device comprises short-range or near-field radio detection means that emits an identification signal that is adapted to be detected by a user device. E.g. this radio detection means may be a RFID-tag. The use of short-range or near-field radio detection means facilitates the identification of one or more components in the lighting system.

In embodiments (e.g. in the case of a visible and/or audible identification signal), the control unit may be adapted to control the one or more signaling devices so that the at least one of a pitch, intensity, color, period and/or other property of the identification signal alternates or otherwise varies with time. By arranging the identification signal alternating, it is easy for an operator to identify the one or more components to which the identification request is directed.

In embodiments, the one or more signaling devices may be operable to provide the identification signal in a plurality of different forms, and the control unit may be adapted to select which of the forms the identification signal takes in dependence on a status of the one or more components to which the identification request is directed. For example the different forms may be audible vs. visual forms; or perceivably different time-varying patterns (e.g. random vs. non-random patterns) such as different visible patterns (e.g. different patterns of blinking) or different audible patterns (e.g. different patterns of beeping). The status being indicated may for example be whether the component has been flagged as already found by the user, or whether a fault is detected at the respective component.

In embodiments, the one or more signaling devices may comprise a light-emitting diode (LED), filament bulb or other type of electric lamp.

Alternatively or additionally, the one or more signaling devices may comprise at least one of a buzzer, an electric bell and/or a loudspeaker.

In embodiments, the one or more signaling devices may comprise a signal source which in normal operation emits a first signal for a primary function other than alerting the user to a direction or location of any of the components of the lighting system; and the control unit may be adapted to control this signal source, in response to the identification request, to emit the identification signal in the form of a second signal distinguishable from the first signal. Thus the control unit advantageously re-uses (or "misuses") an existing signal source for an additional, secondary function of alerting the user to the direction or location of one or more components of the lighting system.

For example, the one or more signaling devices (26a-b) may comprise a data link signal light of the communication network, for emitting a first visible signal indicating a status of a link connecting the respective component within the communication network; and in this case the control unit is adapted to control the data link status light to emit said identification signal in the form of a second visible signal distinguishable from the first visible signal. The use of the data link signal lamp of the communication network provides the advantage that the identification signal can be generated without installing additional signal lamps. Accordingly, the use of the data link signal lamp of the communication network provides a simple and cost effective way of providing a signal device.

The first signal may be distinguishable from the second signal in that it takes a different form. For example, one of the first and second signal may vary randomly whilst the other is non-random, such as a periodic signal. E.g. a light source such as the data link status light may flash randomly in normal operation and periodically when alerting the user to its respective component (or a neighboring component), or vice versa. Alternatively or additionally, the second signal may be distinguishable from the first signal in that it occurs at a time when the first signal would be unexpected, e.g. the first signal only occurs when the user requests a status of the link and the second signal only occurs when the user requests identification of the location of a component.

According to one embodiment of the invention, said one or more signaling devices may comprise a light source adapted to produce an alternating visual identification signal and a sound source adapted to produce an alternating audible identification signal, wherein the control unit is adapted to control the light source and sound source so that the alternating visual identification signal and the alternating audible identification signal are synchronized. By means of a combined alternating visual and alternating audible identification signal, it is easy for an operator to identify the one or more components to which the identification request is directed.

According to an embodiment of the invention, the identification device may comprise one or more microphones arranged at the components, wherein the one or more microphones are used to detect an identification signed from an identification device of another of the components in the system, and thereby determine the distance to that component by use of a ranging technique.

According to another aspect of the present invention, there may be provided an identification system for a lighting system, the identification system comprising an instance of the identification device incorporated in or otherwise located at a respective location of each of a plurality of said components.

According embodiments of the invention, the components are connected in a communication network and the transmitter is adapted to transmit the identification request over this communication network. E.g. the lighting system may be a power-over-Ethernet lighting system based on a power-over-Ethernet network, and the identification request may be transmitted via this network. Alternatively or additionally, the transmitter may be configured to transmit the identification request via another network such as a wireless network, e.g. a mobile cellular network such as a 3GPP network or a local wireless network such as a WiFi or ZigBee network. E.g. in embodiments, the transmitter is a wireless transmitter that is adapted to enable the identification request to be transmitted remotely from the identification device. The wireless transmitter is for example a transmitter of a mobile phone, the mobile phone being the user device. According to an embodiment of the invention, the communication network is connected to the Internet, wherein the identification request is adapted to be transmitted via the Internet using an Internet connection.

According embodiments of the invention, the user device comprises:
 a transmitter adapted to transmit the identification request;
 a user interface; and
 logic adapted to detect the identification signal, and in response to control the user interface to output a corresponding indication to the user, thereby altering the user to the location or direction of the one or more components.

In embodiments, the user interface comprises a display unit, and said indication comprises a visual representation of the one or more components to which the user is being alerted displayed on said display unit (e.g. in the form of a photograph or diagram).

The user device is for example a mobile phone, a tablet computer or a laptop or desktop computer, etcetera, or a dedicated remote control. The user device may comprise a display unit adapted to produce the visual representation of the components of the lighting system and the one or more components to which the identification request is directed.

Accordingly, an operator can quickly and easily identify the one or more components that are to be identified by observing both the identification signal emitted from the one or more signal device of the identification device and visual representation of the lighting system with the identification request.

According to an embodiment of the invention, the visual representation of the one or more components to which the identification request is directed alternates or otherwise varies in intensity. By means of the alternating or varying in intensity of the visual representation, it is easy for an operator to identify the one or more components to which the identification request is directed on the display unit.

According to an embodiment of the invention, the alternating or other varying of the intensity of the visual representation is synchronized with an alternating or otherwise varying identification signal emitted by the one or more signaling devices. By means of synchronizing the alternating or varying visual representation of the lighting system of the display unit with the alternating identification signal emitted by the one or more signaling devices, it is easy for an operator to identify the one or more components to which the identification request is directed.

According to an embodiment of the invention, the user device comprises a loudspeaker and the software program is adapted to produce an audible representation on the loudspeaker of the identification signal that is synchronized with an alternating or varying identification signal emitted by the one or more signaling devices. By means of providing an audible representation of the identification signal emitted by the one or more signal device, it is easy for an operator to identify the one or more components to which the identification request is directed.

According to an embodiment of the invention, the transmitter is configured to transmit the identification request in cycles separated by a pause. By means of transmitting the identification request in cycles, it is easy for an operator to identify the one or more components to which the identification request is directed. This is in particular the case when the identification request is directed to a plurality of components of the lighting system.

The object of the invention is also provided by a lighting system. The lighting system comprises a plurality of components that are provided with identifiers arranged so that each component has a unique identity within the lighting system, wherein the lighting system further comprises an identification device according to any of the embodiments disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
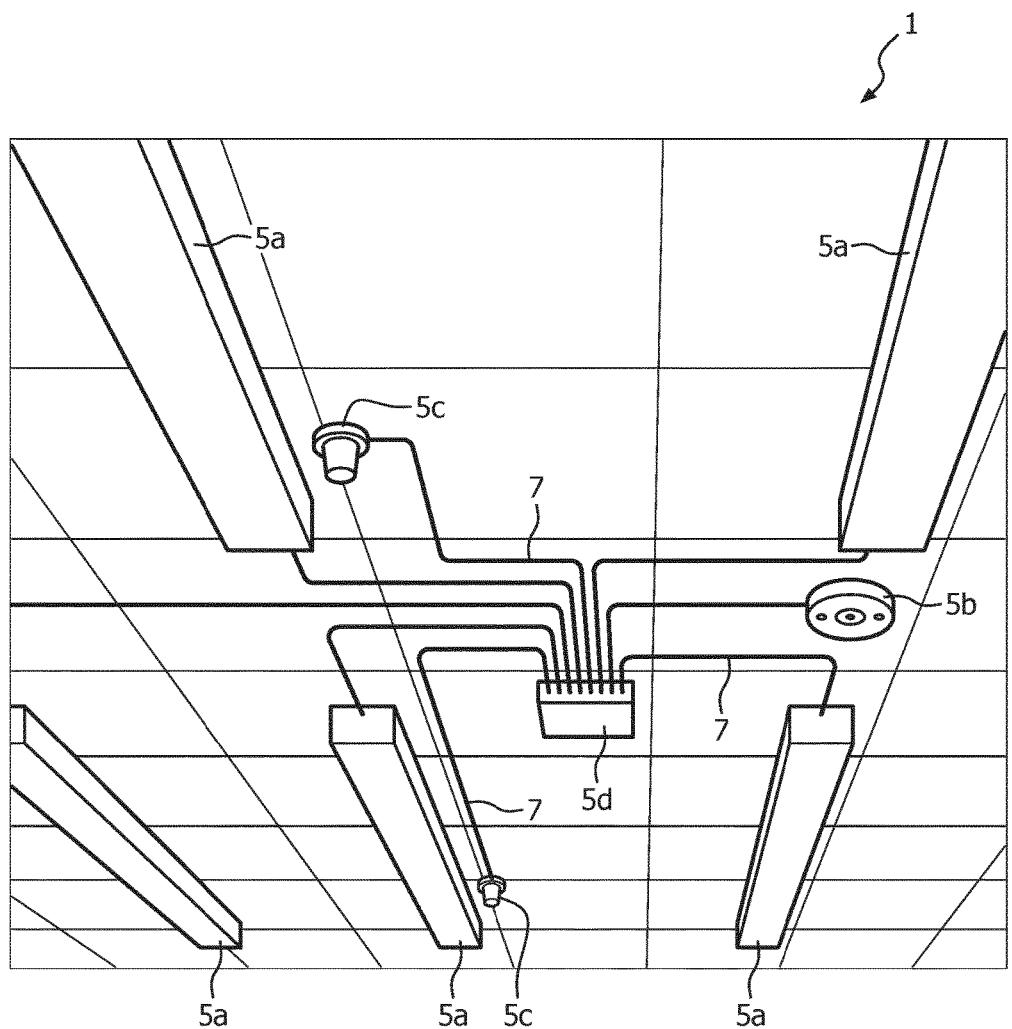
FIG. 1 illustrates a lighting system comprising a plurality of components connected in a communication network.

FIG. 1 discloses a view towards a ceiling of a room (or other indoor space) in which a lighting system 1 is installed. The lighting system 1 comprises a plurality of components 5a-d that are connected in a communication network, such as a Power-over-Ethernet (PoE) installation, where electrical power is transmitted along with data on Ethernet cablings to the components 5a-d of the lighting system 1. By whatever means it is implemented, the communication network enables communication between different ones of the components 5a-d, e.g. to control dimming level or to switch the lights on and off. According to another example, the communication network is a DMX network, or a wireless network, such as a ZigBee network.

In the present installation some of the components 5a-d are visible and some of the components 5a-d are concealed behind the ceiling. However, in FIG. 1, the ceiling is shown as if transparent in order to illustrate the components 5a-d of the lighting system for the purpose of discussion herein. The components 5a-d in the illustrated example of the lighting system 1 comprise a plurality of luminaires 5a, a light detector 5b, smoke detectors 5c and a power supply engine (PSE) 5d. The components 5a-d are connected in the communication network by means of a plurality of cables 7. Below the ceiling are visible elements like the luminaires 5a and sensing means like presence sensors, light detectors 5b and/or smoke detectors 5b. Not visible as installed above the ceiling are e.g. the PSE 5d with all the cabling 7.

The communication network is arranged so that the power supply engine 5d forms a hub to which the luminaires 5a, the light detector 5b and the smoke detectors 5c are connected by means of the cables 7. The communication network enables information to be sent between the components 5a-d. The information sent on the network is for example related to the control of the function of the components 5a-d and/or querying the status of the components 5a-d. In an embodiment of the invention, the communication network is connected to the Internet.

Figure 2:
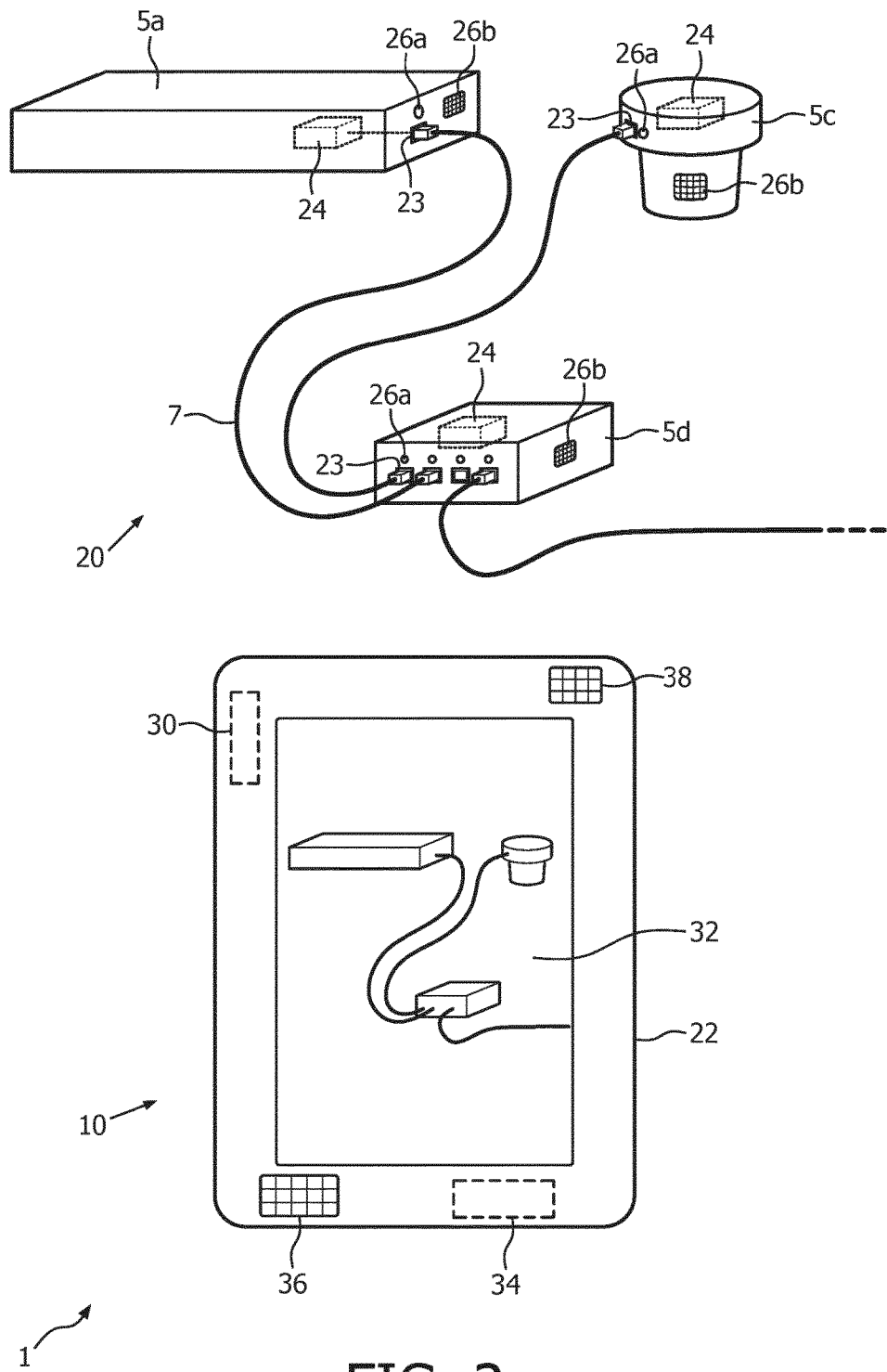
FIG. 2 is a schematic view of a lighting system according to an embodiment of the invention.

FIG. 2 discloses a schematic view of a lighting system 1 according to an embodiment of the invention. In the illustrated example three components 5a-d of the lighting system 1 are shown, a luminaire 5a, a smoke detector 5c and a power supply engine 5d. The components 5a-d are connected in a communication network arranged so that each component 5a-d has a unique identity within the lighting system 1.

It will be appreciated that the system shown is just one example and in other embodiment the lighting system 1 may comprise any combination of any number of these types of component 5a-d and/or others, e.g. user interface components, network switches and/or other types of sensors, such as presence (occupancy) sensors.

The lighting system 1 further comprises an identification system 10 that comprises an identification device 20 and a user device 22. The user device 22 is adapted to transmit an identification request directed to one or more of the components 5a-d of the lighting system 1 on the communication network.

A respective instance of the identification device 20 is arranged at each or the components 5a-d of the lighting system 1, so as to be operable emit a respective identification signal emanating from the location of the respective component. The identification device 20 comprises a receiver 23 for receiving an identification request that is transmitted on the communication network. The receiver 23 is for example a receiver of the same communication network used to communicate between the components 5a-d for other purposes (e.g. control), or could be a separate receiver. According to an embodiment of the invention, the receiver 23 is for example a wired receiver such as an Ethernet receiver, or a wireless receiver such as a Wi-Fi, ZigBee, or Bluetooth receiver, etcetera.

The identification device 20 further comprises a signaling apparatus comprising a control unit 24 and a plurality of signaling devices 26a-b. In the example of FIG. 2, the identification device 20 comprises a first type of signaling device 26a that is adapted to produce a visual identification signal, and/or a second type of signaling device 26b that is adapted to produce an audible identification signal. E.g. in the illustrated example, the signaling devices 26a-b comprise data link signal lamps of the communication network and/or buzzers or beepers arranged at the components 5a-d. The data link signal lamp is for example the network status indicator LEDs of an Ethernet (RJ45) female jack.

The control unit 24 is adapted to receive the identification request that was sent by the user device 22 and determine if the identification request corresponds to the identity of a component 5a-d to which the control unit 24 is in control of. If the control unit 24 determines that the identification request corresponds to the identity of the one or more components 5a-d that it is in control of, the control unit 24 is adapted to control one or more of the signaling devices 26a-b so that an identification signal is produced that identifies the component 5a-d.

For example, if an identification request directed to the luminaire 5a is sent on the communication network, the receiver 23 will receive the identification request and transmit it to the control unit 24 arranged at the luminaire 5a. The control unit 24 will determine if the identification request is directed to the identity of that specific luminaire 5a. If the identity of that specific luminaire 5a corresponds to the identification request, the control unit 24 will send control information to the signaling devices 26a-b of the luminaire 5a so that an identification signal is produced that identifies the luminaire 5a.

Alternatively or additionally, an identification request may be directed to a neighboring component of the component which receives and acts on the request. For example, this idea may be used so that a component capable of generating an identification signal can signal the approximate location of another spatially or logically nearby component that is not capable of generating a suitable identification signal for itself (i.e. a signal for helping the user locate the component). In this case, each component that is capable of generating such an identification signal listens for an identification request directed to any other neighboring components that are not capable. The condition for being treated as neighboring may be defined in a number of ways. For example, each component 5a-d equipped with an instance of the identification device 20 may be pre-programmed with information on which other components are within a certain predefined proximity (e.g. within a predefined radius, or in a same group of components according to some grouping scheme), or may be equipped with a suitable sensor to empirically detect which other components are within the predetermined proximity. As another example, components may be defined as neighboring if they are within a predetermined number of network links of one another (i.e. a predetermined number of network hops between nodes), e.g. only logically adjacent components are considered neighbors (connected directly by a single link or hop). Again each component 5a-d equipped with an instance of the identification device 20 may be pre-programmed with such information on which are its logical neighbors, or may be equipped with a suitable network probing mechanism for discovering this empirically.

To illustrate, one embodiment uses a neighboring luminaire 5a in order to generate an optical signal in response to a request to locate a neighboring PSE 5d. E.g. when asked what PSE a luminaire A is connected to, a luminaire B which is located next to the PSE that A is connected to starts blinking. In another example, an active infrared or ultrasound presence detector can also be of use as a neighboring component to detect the PSE, where the sensor emits an infrared or ultrasound signal which can be detected by a smart device 22.

Note also that in embodiments, the system supports more sophisticated requests than simply "locate the component with ID X". An example of a more sophisticated request would be "locate the component of type Y that the component with ID X is related to", where the relation could be e.g. which component of type Y is X connected to directly (adjacently, by a single link); or which component of type Y is in a same group according to some predefined grouping scheme; or which component of type Y is component X spatially closest to (e.g. by radius). In embodiments the relationship Z could also be specified in the identification request, or instead could just be implicit.

On another point, note that in the illustrated example, each component 5a-d (or at least each of a certain plurality of them) is provided with its own instance of the control unit 24. However, it shall be understood that alternatively a single centralized control unit 24 may be used by the identification device 20 for controlling all the signaling devices 26a-b of the identification device 20. Either way, each of the signaling devices 26a-b can be arranged at or in vicinity of its respective component 5a-d.

The identification device 20 has the advantage that an operator easily and quickly can identify a specific component 5a-d in the lighting system.

The signaling devices 26a-b may produce one or more of various different types of identification signals, such as a visual, an audible, an ultrasound, and/or a radio frequency identification signal. The signaling devices 26a for producing a visual signal may comprise for example an electric lamp such as a light-emitting diode or filament bulb. E.g. the signaling devices may be the pre-existing data link signal lamps of the communication network. And/or, if the component is a luminaire 5a, the luminaire 5a itself may produce the visual signal. The signaling devices 26b for producing an audible signal may comprise for example a buzzer, an electric bell or a loudspeaker. The audible and/or ultrasound signal may furthermore be produced by a capacitive or piezo component. The signaling devices for producing a radio frequency identification signal may comprise for example a short-range (local) RF-transmitter, such as a Wi-Fi, ZigBee or Bluetooth transmitter; or a near-field communication (NFC) device, such as a RFID-tag.

In the case where the identification signal is a signal such as a visual or audible signal (or perhaps even, say, an olfactory signal or a tactile sensation such as a vibration from behind the ceiling or wall), the identification signal is directly perceivable by the human user. This has the advantage that the one or more components to which the identification request is directed can be identified by the user directly and intuitively without any intermediate device. Alternatively or additionally, in the case where the identification signal is a signal such as an ultrasound or RF signal, the identification signal has to be provided to a user device 22 to be perceived by a person (either the same user device 22 that instigated the identification request, or a different user device). Either way, the identification signal emitted from the one or more signaling devices 26a-b alerts a user to a location or direction of the one or more of the components (5a-d).

In the illustrated example, both a visual and audible identification signal can be produced by the signaling devices 26a-b at the components 5a-d. According to an embodiment of the invention, the control unit 24 controls the signaling devices 26a-b so that an alternating identification signal is produced, i.e. a cyclical time-varying signal (e.g. on-off). For example the identification may comprise a blinking light from the data link signal lamps 26a and a beeping sound, which makes it easier to identify the component 5a-d to which the identification request is directed. Preferably, the visual and audible identification signal are synchronized. By means of using a plurality of alternating signaling devices 26a-b the one or more component 5a-d can easily be identified by an operator.

In embodiments, at least one of the one or more signaling devices 26a-b may be a signaling device that is already present in or at the respective component 5a-d for another, primary purpose other than helping thus user locate the component 5a-5d. An example would be the data link signaling light, such as the network status indicator LED(s) of an Ethernet (RJ45) female jack, which indicates a status of the corresponding network link. Another example would be the infrared or ultrasound emitter of an active infrared or ultrasound presence sensor (respectively). In such cases, the signal emitted by the signaling device in question takes a first form when used for its primary purpose, i.e. in normal operation, but may modulated to take a different, second form when re-used for a secondary purpose of altering the user to the position of the respective component 5a-d in response to the identification request.

For instance, a light-emitting diode (LED) or other lamp may be adapted to vary in a first pattern in its normal operation and a second pattern when emitting the identification signal. The light-emitting diode may be adapted to vary in the first and the second pattern by varying the intensity of the light emitted differently, such as by alternating the intensity of the light emitted differently (e.g. different blinking patterns). In one such example, the data link signal lamp may blink randomly when used for its normal, primary purpose of indicating link status, but blink in a regular fashion when used for locating its respective component, or vice versa.

By arranging the identification signal so that it forms a second pattern that is distinctly different from the first pattern, the one or more components of the identification request can easily be identified by the user. E.g. if the second pattern is arranged so that the data link signal lamp blinks periodically, this makes it easy to distinguish from the randomly blinking of the data link signal lamp in its normal operation.

As an alternative or in addition to the above, in embodiments the control unit 24 may be adapted to control the one or more signaling devices 26a-b, in dependence on the status of the component 5a-d to which an identification request is directed, so that one of a plurality of different possible identification signals are produced each indicative of a different status of the component 5a-d. That is, it is possible to switch between different identifying modalities in dependence on a status of the component 5a-d in question, in order to reflect that status.

For example, in embodiments the system may provide a mechanism by which the user can flag components 5a-d that he or she has already found, e.g. by indicating them via a user interface 32 of the user device 22 (and an application or other logic on the user device 22 that communicates this information to the relevant control unit(s) 24). For instance, the system may use beeping for locating unfound ones of the components 5a-d and blinking light to indicate others of the component 5a-d that have already been found, or vice versa. Or a property such as intensity, color, frequency or time delay in the identification signal may indicate the order of device finding or intended device servicing, etc.

As another example, the indicated status comprises an indication of whether a component is faulty, an indication of whether a fault is anticipated, or other fault-related information; e.g. based on the operating temperature, operating current, burning hours, whether a component is correctly installed or not, etcetera. In this case, the identification device 20 comprises at least one sensor (not shown) for detecting the relevant parameter or parameters of its respective component 5a-d, and the respective control unit 24 is adapted to receive this information from the sensor device and, on basis of this received information from the sensor device, detect a fault or anticipated fault in one or more of the components. The information from the sensor may comprises parameters such as electric current, temperature, burning hours, etcetera; and the detection on whether one or more of the components are fault is for example made on the basis of whether the parameter exceeds a threshold value. E.g. the fault may that the energy consumption, current or temperature of the component 5a-d is higher than what is normal for its operation.

If such a condition is detected, the control unit 24 adapts the identification signal accordingly to indicate this to the user. For example, a higher level or frequency or a different color in the identifying modality (e.g. sound pitch, light intensity, blinking or beeping frequency) can be used to indicate additional fault-related status information (e.g. maintenance completed, replace device warning, etc.). Or instead of interpreting the level relative to a threshold, the level or frequency could even be used to indicate a degree of the fault related parameter, e.g. a pitch, intensity or blinking or beeping frequency may increase as a matter of degree with a parameter such as the operating temperature or current. By providing status information to the identification signals, an operator can quickly localize a defect component 5a-d or a component 5a-d that needs to be replaced.

In further alternative or additional embodiments, the identification signal may be modulated with an embedded code, e.g. by modulating the intensity or pulse duration of a visible light signal, or the intensity or pitch of an audible signal. The code could indicate information associated with the identification such as a status, identity, location (e.g. in terms of coordinates), etc. Preferably, the modulation is directly perceivable by the user, e.g. is visible or audible (unlike, say, coded light which is modulated at frequency beyond human perception). That is to say, the modulation is perceivable by the user without needing any intermediate device such as a user terminal 22. For instance, the beeping and/or blinking can also be coded such that each code identifies which PSE the coded sound in coming from. E.g. eight fast pulses could be used to identify a PSE with code number XXX, and seven fast then one slow pulse could be used to identify a PSE with code YYY. Or as another example, Morse code could be used to signal such information in the identification signal, with a long beep or flash for a dash and a short beep or flash for a dot. Other sound properties like pitch and volume could also be used to convey other codes, or other light properties such as color. In some embodiments, the code may also be decoded at a smart phone or tablet (e.g. the user device 22) and displayed on a map indicating the actual position of the PSE. The possibility of an imperceptible code that is detected by the user device 22 is also not excluded, e.g. using coded light.

In yet further alternative or additional embodiments, a perceivable pattern formed between two or more of the identification signals from two or more respective components 5a-d may be used to show the user a relationship between these components. Preferably, the relationship is indicated by means of a synchronization or time-relationship between the individual time-varying patterns of the identification signals emitted by the two or more components, such as a synchronization or time-shift between the blinking and/or beeping.

For example, if the components 5a-d are grouped into discrete groups according to some predefined grouping scheme, the relative timing of their identification signals may indicate which components 5a-d are in the same group. E.g. the identification signals from all the components 5a-d in the same group may blink or beep in unison. Or if the components 5a-d are arranged in an a spatial sequence (e.g. a row) or array (e.g. grid), the relative timing of the identification signals from these components may indicate which components are in the same sequence or array, and/or their relative positions in the sequence or array. E.g. the blinking and/or beeping signals from each of the components 5a-d in the sequence or array may be shifted relative to one another in time, so first the first component in the line flashes or beeps (or the like), then at a slightly later time the component at the next position in the sequence flashes or beeps, and so forth, and similarly for a 2D or 3D array if a suitable order is assigned over the two or three dimensions. As yet another example, the relative timing of the identification signals from two or more of the components may indicate a logical relationship between them in terms of network connections. E.g. if a string of components is connected in series, then the blinking and/or beeping signals from each of the components 5a-d in the sequence or array may be shifted relative to one another in time to indicate position along the string (in a similar manner as described for a spatial sequence); or the relative timing of the blinking or beeping may indicate which components 5a-d are connected to the same power supply engine or network switch, so that first the PSE or switch flashes or beeps (or the like), then at a slightly later time all of the components connected to it by an adjacent link flash or beep.

The use of such synchronized or time-related blinking and/or beeping, or the like, has the advantage that the relationship between the two or more components is easy to identify by observing the lighting system.

The use to the identification signals to indicate the relationship between components 5a-d could be triggered in a number of ways. For instance, the identification request may specify only a particular one of the components, but in response the control units 24 may identify all those components in the same group, sequence, array, or string. E.g. the identification signal specifies "identify the component with address X", and in response the control units 24 at all the components in the same group or the like, or the identification signals fan out from the (so that first the specified component flashes or beeps, or the like, then at a slightly later time all of the components connected to it by an adjacent link flash or beep, and perhaps then a slightly later time still the components that are two hops away flash or blink, and so forth). Such behavior could be an option that the user can specify in the identification request (e.g. "show me all components connected to PSE X"), or could be implicit.

Alternatively, the identification signal need not specify a specific address or ID. Instead for example, the identification request may specify "identify all components in group A". Or the identification signal could even be completely indiscriminate, so that in effect it just requests "show me how all components are related". E.g. in response to the identification request, the control units 24 emit their identification signal sin a time-shifted pattern across the whole system, such as by starting with a central component and then fanning out in order of number of network links (hops) from the central component, or by starting with a certain position in a sequence or array and then preceding in a predetermined order.

The user device 22 will now be explained in further details. The user device 22 comprises a transmitter 30 for transmitting an identification request to one or more of the components 5a-d. According to an embodiment of the invention, the identification request is transmitted from the user device 22 to the one or more of the components 5a-d by means of the communication network of the lighting system 1. The transmitter 30 for transmitting an identification request is for example a wireless transmitter, such as Wi-Fi, ZigBee, Bluetooth, etcetera. For example, the request could be transmitted via the same and/or different network as connects together the components 5a-d of the lighting system 1 (the communication network). Requests could be sent by a wired or wireless connection and could be provided by an application (app) running on a user device 22 in the form of a smart phone, tablet or laptop computer, or by a user device 22 in the form of a dedicated remote control or a wall panel.

For example, the user device 22 may send the identification request to the control unit 24:

directly via a wireless link, e.g. Wi-Fi, ZigBee, Bluetooth, etcetera, such as in the case where the user device is a phone, tablet, laptop or remote control;

directly via a wired connection to the communication network of the lighting system 1 (e.g. Ethernet network or DMX network), such as in the case where the user device is a wall panel, desktop computer or other fixed or stationary unit;

wirelessly via a wireless access point/router of the communication network of the lighting system 1 (e.g. Wi-Fi access point to Ethernet network); or via the Internet (a wired or wireless connection to Internet, over the Internet then through a gateway between the Internet and the communication network of the lighting system 1), such as by using a mobile cellular connection like 3G or a local wireless connection like Wi-Fi to connect to the Internet.

Each component 5a-d has a unique machine-readable identity within the lighting system 1. The identity of the components 5a-d is for example a string of numbers and characters such as a serial number or IEEE address of the component, or an address of the component in the communication network. The user device 22 includes the machine-readable unique identifier, in the identification request to the lighting system 1 in order to identify which component 5a-d is sought.

In embodiments of the invention, the user device 22 further comprises a display unit 32 and a logic unit 34 for executing a software program. The user device 22 is for example a mobile phone, a tablet computer, a laptop or a desktop computer, etcetera, or a dedicated remote control. The display unit 32 is adapted display a visual representation of the components 5a-d of the lighting system 1. The logic unit 34 is adapted to execute a software program (application) that produces a visual representation of the components 5a-d of the lighting system 1 on the display unit 32. The logic unit 34 is for example a CPU. The software program is further adapted to control the transmitter 30. The user device 22 further comprises input means for input of information, such as the identity of a component 5a-d for an identification request. Thus the application running on the user device 22 provides a means by which the user can instigate the identification request in accordance with embodiments of the present disclosure. For example, the display unit 32 may display a visual representation of the components 5a-d of the lighting system 1, from which the user can select the component or group of components that he or she (e.g. using the touch screen of a smartphone or tablet). E.g. the components 5a-d may be shown on a floorplan or schematic circuit diagram.

In embodiments, the application on the user device also provides a means to assist the user in locating the desired components 5a-d. In this case the application uses one or more sensors of the user device 22 to detect the identification signal emitted by the respective identification device 20 of one or more of the components 5a-d, and in response outputs a further signal from the user device 22 to assist in locating the relevant component 5a-d. For example the display unit 32 may display a visual representation of the components 5a-d of the lighting system 1 (E.g. again on a floorplan or schematic circuit diagram), and the visual representation of a component 5a-d may alternate in intensity in response to detecting the identification signal. Thereby, the visual representation of the component 5a-d can easily be identified on the display unit 32.

In one embodiment, the user device 22 comprises a loudspeaker 36 adapted to produce an audible representation replicating the identification signal of a component 5a-d to which the identification request is directed. E.g. the pitch of intensity of the audible representation may increase as the user device 22 is moved closer to the component 5a-d in question. In one particular embodiment, the alternating visual representation of the component 5a-d may be synchronized with an alternating audible representation of the identification signal. According to an embodiment, the user device 22 is adapted to transmit identification requests in cycles separated by a pause. Thereby, it is easier to identify the one or more components 5a-d to which an identification request is directed.

According to an alternative embodiment, the identification signal is only provided by the display unit 32 and/or the loudspeaker 36 of the user device 22. Thereby, identification signals that are not perceivable to a human being can be transmitted from the signaling devices 26a-b at the one or more components 5a-d and received by user device 22 that produces a visible signal on the display unit 32 and/or an audible signal on the loudspeaker 36 that alerts the user to the location or direction of the one or more components 5a-d to which the identification request is directed. Thereby, identification of the one or more components 5a-d can be accomplished with little interference to the environment around the lighting system 1.

In another embodiment, the user device 22 comprises a microphone 38 that is used for assisting the user to locate the one or more of the components 5a-d. I.e. the user device 22 uses the microphone 38 to detect an audible identification signal from one or more of the components 5a-d, and in response generates an additional signal alerting the user (e.g. on screen). In a further embodiment, the components 5a-d comprise microphones and perform a form of ranging, so that the location can be estimated automatically or possibly even remotely in addition to alerting the user.

In further embodiments, the identification signal also indicates a fault or fault-related information (as discussed above), and this information may also be detected in said signal by the application, and reflected on the display 32. For example, when the application detects a fault indicated in the identification signal (e.g. a lamp that consumes too much power and would overload the system), then the user interface on the user device 22 (e.g. a tablet PC) shows this fault by means of flashing the faulty components on a floorplan or circuit diagram or such like, perhaps in the same rhythm as the audible signal.

In further embodiments, the identification request to an unlocated one of the components 5a-d could be triggered from another of the components 5a-5d of the lighting system. E.g. the other component may forward a request from the user device 22, or a user interface on said other one of the components 5a-5d (whose location is known and which is accessible) could act as the user device 22.

In some embodiments, there may be special rules for the power supply engine 5d (Ethernet switches) regarding forwarding the identification request over the different ports. E.g. forwarding may only be possible to the ports of the loads, but not to any daisy chained devices, e.g. other power supply engine 5d, etcetera. By means of modulating the data activities for a certain components 5a-d, the related plugs and hence the cable connection can be easily found by looking at a particular pattern on the switch's link/data LEDs. Alternatively, the components 5a-d may have dedicated signal lamps which can be set by control unit 24. The modulation of the data activities can be triggered real-time by the control application, e.g. the app generating packets of particular type with particular frequency, making requests for responses, etcetera. Also a single command can be used to set the component 5a-d in a mode, when the component 5a-d will generate this special communication sequence itself.

In combination with the audible identification signal, the user may locate the place at which to open the ceiling and then search for the blinking data link signal lamps. Alternatively, to identify the exact port once the power supply engine 5d has been found, an app on the user device 22 can provide the information sought for. The app could e.g. display a representation of the power supply engine 5d, e.g. a photo of the port panel, a schematic drawing, etcetera, with the port highlighted, and/or indicate the port number in another way, e.g. displaying the number itself and/or describing its location in the switching panel, for example row 2 from the top, 5th port from the left, etcetera.

Figure 3:
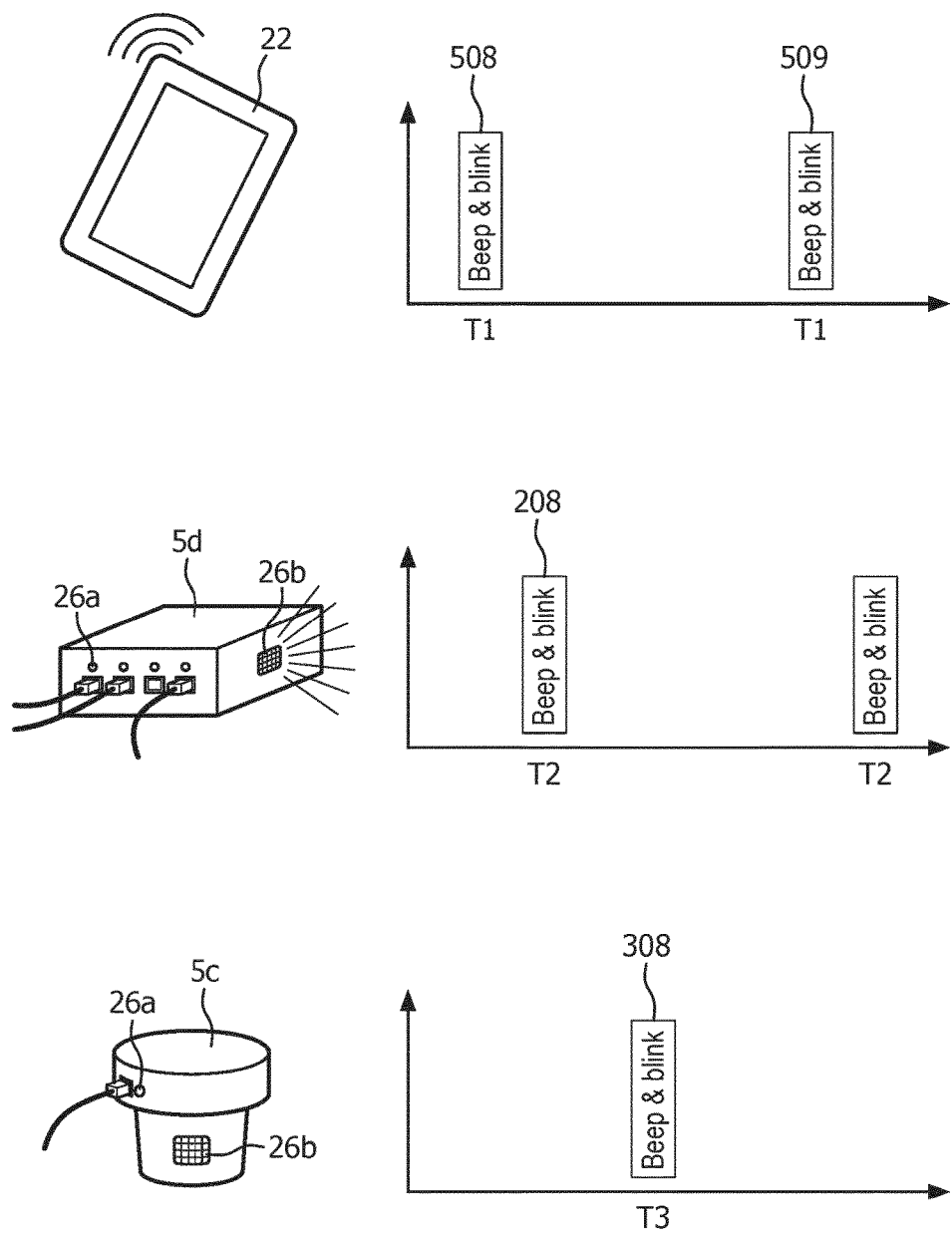
FIG. 3 illustrates an example of the operation of the identification device according to an embodiment of the invention.

FIG. 3 discloses an example of the operation of the identification device 20, where a user device 22 in the form of a smartphone is giving an identification request 508 to search for the power supply engine 5d and the smoke detector 5c. Beneficially the identification signal generation is performed cyclically so that after a certain pause, the smartphone starts a next cycle by emitting the next signal 509 and initiating the respective signals of the components 5a-d searched for. Preferably, there is also provided a way of stopping the identification signal for a component 5a-d, e.g. to stop the identification signal of a component 5a-d already found, to continue with the search of the remaining components 5a-d. In the same manner, an identification request 308 to search for the smoke detector 5c is illustrated in FIG. 3.

Note that when using a user device 22 to detect the identification signal, the identification signal does not have to be visible or audible. E.g. ultrasound is also useful and can be generated by signaling device 26a, 26b in the form of a capacitive or a piezo components added to a component 5a-d. In this case a receiver decoder of the user device 22, such as a smart phone, receives the ultrasound and perform the location by mapping. Furthermore, a very often used infrared presence detector can also be of use as a neighbor acting element to detect the components 5a-d and provide information to the user device 22.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An identification device for a lighting system wherein the lighting system comprises multiple components, and wherein the identification device comprises:
   a receiver adapted to receive an identification request from a user device, and
   a signaling apparatus comprising a control unit and one or more signaling devices, wherein the control unit is adapted to control the one or more signaling devices so that, in response to receipt of the identification request, an identification signal is produced that alerts a human user to a location or direction of one or more of the components,
   wherein:
      the components are provided with identifiers arranged so that each component has a respective unique identity within the lighting system,
      the identification request is directed to a specified one or more of said components based on one or more of the identities,
      the control unit is adapted so that the identification signal is produced in dependence which of the components the identification request is directed to,
      said identification device or at least said one or more signaling devices is/are incorporated in a respective one of said components or otherwise located at a respective location of the respective component, such that the identification signal is emitted from the respective location of the respective component, and
      the identification signal is emitted from the respective component in response to the identification request being directed to a neighboring one of said components within a predetermined proximity from the respective component or a predetermined number of network links from the respective component, thereby alerting the user to the direction or location of the neighboring component.

2. The identification device according to claim 1, wherein the identification signal comprises at least one signal directly perceivable by the human user.

3. The identification device according to claim 2, wherein the control unit is adapted to control the one or more signaling devices so that a pitch, intensity, color, period and/or other property of the identification signal alternates or otherwise varies with time.

4. The identification device of claim 2, wherein said identification device or at least said one or more signaling devices is/are arranged to be used in conjunction with another instance of the identification device or the one or more signaling devices incorporated in or otherwise located at a respective location of each of a plurality of others of said components, such that another instance of the identification signal can be emitted from the respective location of each of said one and said plurality of others of the components; and wherein the control device is configured so that a relationship between two or more of the components is indicated by a relative pattern formed between the identification signals emitted by two or more of the components.

5. The identification device according to claim 1, wherein the one or more signaling devices comprise one or both of:
   a light source, said identification signal comprising a visible signal emitted by the light source; and/or
   a sound source, said identification signal comprising an audible signal emitted by the sound source.

6. The identification device according to claim 5, wherein the one or more signaling devices comprise a data link signal light of the communication network, for emitting a first visible signal indicating a status of a link connecting the respective component within the communication network; and the control unit is adapted to control the data link status light to emit said identification signal in the form of a second visible signal distinguishable from the first visible signal.

7. The identification device according to claim 5, wherein the one or more signaling devices comprise the light source and the sound source; wherein the light source-42+a is adapted to produce said visual signal in an alternating form, and the sound source is adapted to produce said audible signal in an alternating form; and wherein the control unit is adapted to control the light source and the sound source so that the alternating visual and audible signals are synchronized.

8. The identification device of claim 1, wherein the identification signal is emitted in response to the identification request being directed to the respective component, thereby alerting the user to the location or direction of the respective component.

9. The identification device according to claim 1, wherein the one or more signaling devices are operable to produce the identification signal in a plurality of different forms, and the control unit is adapted to select which of the forms the identification signal takes in dependence on a status of the one or more components to which the identification request is directed.

10. An identification system for a lighting system, wherein the identification system comprises an instance of the identification device according to claim 1 incorporated in or otherwise located at a respective location of each of a plurality of said components.

11. The identification system according to claim 10, further comprising the user device, wherein the user device comprises:
   a transmitter adapted to transmit the identification request;
   a user interface; and
   logic adapted to detect the identification signal, and in response to control the user interface to output a corresponding indication to the user, thereby alerting the user to the location or direction of the one or more components.

12. The identification system of claim 11, wherein the user interface comprises a display unit, and said indication comprises a visual representation of the one or more components to which the user is being alerted displayed on said display unit.

\* \* \* \* \*